:::
United States Patent [19]

Scott et al.

[11] 3,792,986

[45] Feb. 19, 1974

[54] METHOD OF FABRICATING, USING AND RECONDITIONING APPARATUS FOR FORMING OPTICAL QUALITY ARTICLES FROM MOLTEN GLASS AND FORMING ELEMENTS FOR USE THEREIN

[75] Inventors: Jack T. Scott; William H. Browne, both of Cincinnati, Ohio

[73] Assignee: Scott-Browne Corporation, Cincinnati, Ohio

[22] Filed: May 8, 1972

[21] Appl. No.: 250,963

[52] U.S. Cl.......................... 65/27, 29/401, 65/374, 249/114, 249/115
[51] Int. Cl............................................. C03b 9/34
[58] Field of Search 29/401; 249/114, 115; 117/5.3, 117/160 R; 65/26, 27, 374

[56] References Cited
UNITED STATES PATENTS

| | | | |
|---|---|---|---|
| 1,466,640 | 8/1923 | Coleman | 65/374 X |
| 1,575,122 | 3/1926 | Madsen | 117/5.3 |
| 2,212,984 | 8/1940 | Greed | 65/374 X |
| 2,966,423 | 12/1960 | Shichman | 117/5.3 X |
| 3,376,122 | 4/1968 | Domicone et al. | 65/27 |
| 3,468,644 | 9/1969 | Leaman | 65/374 X |

*Primary Examiner*—Jr. Lindsay
*Attorney, Agent, or Firm*—Wood, Herron & Evans

[57] ABSTRACT

The overall process of manufacturing molded articles, and particularly optical quality articles from molten glass is greatly enhanced, and the cost thereof is greatly reduced, by an improved glass mold element and process of making, using and reconditioning glass mold elements. A hard heat conductive mold element core is formed and shaped undersize by at least about .010 inches relative to an ultimate desired shape and then is built up to beyond this shape by a heavy layer of electroplated nickel of roughly 0.050 to 0.100 inches in thickness, which layer is then machined and polished down to desired size and finish. The electroplating process is one which results in stress-free electroplated deposit which avoids warping and microcracking of the nickel layer. An electroplating process which results in a lamilar crystalline structure of the plated layer is suitable, and of these processes a conventional sulfamate nickel plating process has been found highly successful and is therefore preferred. After continued use and repolishing to remove oxidation, scratches, etc., the mold is reconditioned by stripping the nickel layer and replating the mold as before. The repeated reconditionability provided by the process and mold element of the present invention reduces costs, and the mold elements formed thereby are found to be better and longer lasting than those of the prior art.

16 Claims, 3 Drawing Figures

METHOD OF FABRICATING, USING AND RECONDITIONING APPARATUS FOR FORMING OPTICAL QUALITY ARTICLES FROM MOLTEN GLASS AND FORMING ELEMENTS FOR USE THEREIN

The present invention relates to the manufacture of articles from molten glass, especially articles of optical quality, and more particularly to the construction, use and maintenance of the forming elements employed in the glass molding apparatus.

BACKGROUND OF THE INVENTION

In General

In the manufacture of articles from molten glass, the apparatus that is employed is provided with a pair of mold elements. Usually this pair includes a lower mold element having an upper concave forming surface shaped to that of an object to be formed, and an upper mold element or plunger having a mating lower convex forming surface. In operation, a hot gob of molten glass, usually in the temperature range of from 1000°F to 2000°F, is dropped onto the forming surface of the lower mold. The plunger then is driven downwardly into the lower mold element to squeeze the molten glass between the opposed surfaces of the mold elements until the glass assumes a desired shape filling the mold. When a glass has hardened sufficiently, the plunger is retracted and the object is extracted from the mold. This general procedure is quite ancient and has inherent in it many problems toward which much effort has been directed through the years.

Problems in the Prior Art

One of these problems has been to design mold elements which will maintain a certain dimensional stability throughout their use, that is, to design mold elements which will not alter their shape as they are used. This is particularly important when relatively thin flat objects or articles are to be made. The dimensions of the manufactured articles will be determined by the point-to-point clearance between the opposed surfaces of the mold and plunger elements at the maximum downward extent of the plunger stroke. The slightest change in the shape of any one of the mold elements may result in a significant and intolerable change in the shape of the formed object.

The maintaining of the dimensional stability of the mold elements must be done in the presence of stress and temperature changes. The strength of the mold elements must be such that they do not deform under the stresses which are present during the compression process. In high speed automatic machines, these stresses can be significant and design effort must be undertaken to insure that the elements are sufficiently strong to withstand such stresses to prevent their deformation to a degree which would result in unacceptable deviations from the desired article shape. Temperature also has an effect on the dimensional stability of the molded elements, and it is necessary to select materials for these elements which have coefficients of thermal expansion (within the range of from 20°F to 2000°F) that are small or relatively insignificant. Also, materials must be selected which maintain their strength over these temperature ranges and which do not soften and undergo metallurgical changes over this temperature range. In addition, wear of the mold surfaces which alters their dimensions correspondingly affects the shape of the objects molded. To counteract this, the surfaces of these mold elements may be made of hard materials so that they will better withstand the abrasive effects of the molten glass flowing along the surfaces of the elements as the glass flows throughout the mold and of the hardened glass objects as they are ejected from the mold. If the surfaces are not sufficiently hard to withstand these abrasive effects, they will very rapidly wear to the point that their surfaces do not conform to the desired tolerances. Rapid wear results in short mold element life, high machine down time and high maintenance costs.

The thermal conductivity of the mold elements is also important. These elements must be made of materials which will conduct heat from the glass at a sufficient rate to promote a rapid cooling and hardening of the molded article. When composite mold elements are used, that is those which have parts made of several different materials, it is necessary that the bond between the materials be sufficient to permit rapid thermal conduction between the mold parts.

It is also important in the design of such mold elements that their surfaces exhibit low adhesion to both the molten and hardened glass. For example, it is desirable that the frictional drag exhibited by the mold surfaces on the molten glass as the glass is extruded or squeezed between the forming element surfaces be low so that the molten glass may flow freely and rapidly to fill the mold with minimum pressure. Furthermore, it is important that the surface readily release the glass articles once formed so that the articles may be easily withdrawn from the mold. High drag and poor release properties result in slower operation, higher stresses and more rapid wear of the forming elements. Such adhesion properties are usually dependent on a combination of factors which include the surface finish of the mold elements and the inherent intrinsic properties of the surface material. For example, it has been found that the molten glass will flow more freely across a nickel surface than a chromium surface and also more freely across a smooth surface than a rough one.

Furthermore, the surface finish itself is a determining factor in the resultant finish of the article which is formed. Smooth clean forming element surfaces will impart a smoother finish to the articles to be formed. This is one of the more important factors in the manufacture of optical quality glass, toward which this invention is primarily directed and the use of which yields its most significant advantages. Optical quality glass articles are, in this specification, defined as those which require higher polish than ordinary commercial quality articles so that they may, for example, exhibit better light transmission or reflection properties, and be better receptive to coatings, etc. Such articles include, for example, lenses for lamps, television picture tubes, and the like, wherein surface irregularities or low polish characteristics would render the object unsuitable for the light transmission or reflection purposes for which they are intended by unduly distorting or diffusing light. The present invention is most useful in the manufacture of those articles which are to be formed to this quality finish directly from molten glass without extensive subsequent grinding and polishing. The invention yields its greatest economic advantages in the manufacture of larger articles.

The manufacture of optical quality glass, and to a lesser degree the formation of any type of glass article, can be better performed when the molding element surfaces have a high polish and are free of impurities. Any roughness on the surface of the forming elements will be impressed upon the formed articles. Initial high polishing of the surface at least temporarily overcomes this disadvantage; however, the surface, it has been found, rapidly deteriorates through use. The deterioration is caused to a major degree by chemical reaction at the high temperatures which are involved. This reaction results in what is normally referred to as oxidation of the forming element surfaces and this so-called oxidation dulls the surface finish and causes a resultant duller finish of the formed articles. The chemical reactions involved are complex but generally can be said to be caused by reaction of the metallic surface of the forming element with components of the molten glass. This oxidation will eventually reach a point during use at which the surfaces of the glass articles formed are unsuitable and at this point the forming elements must be repolished to remove this chemical scale or film from the surface. In addition to affecting the smoothness of the surface, this film may impart other undesirable qualities to the formed articles such as, for example, discoloration. In display screens and television picture tubes, particularly in color picture tubes, such discoloration cannot be tolerated to any appreciable degree.

Prior Art Solutions

The problems outlined above have been approached in many ways in the prior art. One suggested solution to some of the problems involves the use of nickel. For example, it has long been recognized that nickel possesses certain desirable properties which are useful in making glass forming mold elements. Some of these properties are set forth in the British Patent of Mills, No. 22,577, Nov. 8, 1901. This patent points out that the still commonly used cast iron molds, after several hours of contact with hot glass, will oxidize, destroying the polish of the molds and producing dead and wrinkled surfaces in the articles which are molded, and causing adhesions of the articles to the mold. This oxidation requires long and laborious cleansing operations to be performed on the molds which eventually deform and enlarge the molds until they become uselss. Mills points out that making molds of solid nickel or galvanizing the surfaces of larger molds with nickel renders them highly resistant to oxidation. Nickel, Mills points out, has a low expansion coefficient, and has virtually no tendency to oxidize. Further, its surface does not retard the flowing action of the glass and does not adhere to the glass.

Nickel has also been found desirable in the manufacture of mold elements for use in making optical articles such as glass lenses. Such a use is disclosed in the 1916 U.S. Pat. No. 1,177,177 of Feix. This patent shows solid nickel mold elements mounted at the jaws of a pair of tongs. These elements are used to make relatively small, thick glass lenses.

The general desirability of coating glass molds with non-oxidizable material as a solution to the oxidation problem is further suggested in Coleman U.S. Pat. No. 1,466,640, which issued in 1923. In this patent, the non-oxidizable material, which is not specifically disclosed, is welded onto the surface of the mold.

Several drawbacks have been recognized in the attempts to make molds of nickel. Some of these are set forth in the U.S. Pat. of Madsen, No. 1,575,122, Mar. 2, 1926. Madsen points out the high cost involved and difficulty in obtaining pure nickel in pieces sufficiently large to be machined to the required accuracy for glass molds. Madsen suggests the electroplating of glass molds with nickel, noting the desirable oxidation properties, ductility and purity of the content of the plating. Madsen also suggests the backing of this metal with a heavier casting metal to give it strength since nickel alone forms a relatively weak mold element. To overcome the undesired softness and susceptibility to chemical reaction of the nickel, the nickel coating on the Madsen mold is intentionally oxidized, in somewhat of a controlled manner, to present a hard and firmly adherent surface which resists further oxidation and chemical reaction.

The softness of nickel metal results in a lack of resistance to wear which has been generally regarded as a disadvantage, particularly in high speed glass forming machines. Also the cost of obtaining a suitable nickel surface has not been regarded as worthwhile in most glass applications. These factors have caused a tendency toward the use of alloys of nickel or other metals such as chromium to present a harder, more durable surface. Typically, Monel metal, Duro-nickel, 410 stainless steel and cast iron have been used for this purpose.

Along this line of solutions to the problems, Greed, in U.S. Pat. No. 2,212,984, suggests the use of the nickel-copper-tin alloy as being desirable for the surfaces of glass molds in that it possesses oxidation resistance and hardness which resists abrasion and lends the surface to non-abrasive cleaning techniques. Kelly et al, in U.S. Pat. No. 2,326,730, suggest the lining of glass molds with nickel-iron inserts. This is stated by Kelly as providing a non-oxidizable molding surface with efficient heat dissipation and which is inexpensive to manufacture. Kelly states, in his patent, that a pure nickel glass mold cannot be made thick enough to adequately dissipate heat because of the cost of preparing such a mold. Kelly further reveals the problems involved in fusing nickel to cast iron and other base metals.

More recent developments have also had as their objective the providing of a hard glass contacting surface as well as a surface which is oxidation resistant. For example, McGowan U.S. Pat. No. 3,070,982 suggests the use of a glass mold having a nickel phosphorous surface plated onto a base metal by a chemical reduction process. McGowan states that this process possesses a considerable advantage in cost and convenience over the electrolytic plating process in that it yields a Rockwell hardness of between 65 and 70 while electroplated nickel yields a Rockwell hardness of only about 52.

The Richards U.S. Pat. No. 3,204,917 suggests the manufacturing of a glass mold and a glass contacting surface composed of a nickel chromium alloy which is spray coated onto a forming mandrel in a thickness of between 0.007 inches and 0.100 inches. This also forms a hard oxidation resistant surface. Richards makes reference generally to the electroplating of pure metals, but states the extreme time consuming nature of the process when thick coats are to be deposited.

Present State of the Prior Art

While the past work done by those skilled in the art, as typified in the discussion above, has done much to advance the art, the improvements noted have been less than completely satisfactory when measured against present standards and objectives. In high quality optical glass making, for instance, the cost of mold elements is a major cost factor. The mold elements still oxidize too rapidly, wear too rapidly and have far too short a useful life before they must be scrapped or reconditioned.

For example, in the manufacture of optical quality glass, such as that used in the manufacture of television picture tubes, the tendency has been to use hard abrasion-resistant metals for both the mold element and the plunger element. Such metals employed are typically number 420 stainless steel and Duro-nickel alloy. One such mold is discussed in the U.S. Pat. of Null, No. 3,589,986, showing a color picture tube plunger selectively plated with chromium. Accordingly, the present state of the art in the manufacture of optical quality glass articles, particularly large thin articles such as television picture tubes, prefers the utilization of forming elements made of hard abrasion resistant metals and which bear reasonably good oxidation and chemical reaction resistance properties.

Typically, the overall process employed in making, using and maintaining these molds in the manufacture of glass articles, including those of optical quality, is one of initially forming the molds and then utilizing the molds until, through normal deterioration, the molds can no longer be continuously employed. This deterioration results from both mechanical abrasion and chemical reaction of the mold surfaces. When mechanical deterioration such as wear and abrasion occur, the mold will eventually fall outside of the accepted size tolerance ranges and must be completely scrapped and replaced. Sometimes the scrapped molds can be cut back to the next smaller size. Often a single element of a color picture tube mold costs many thousands of dollars. When a worn mold element can be reused to form another mold element, this can be done for about one-half the cost of a new mold element, but such opportunities are limited and insignificant.

Chemical reaction of the surface such as that which is normally referred to as oxidation occurs quite rapidly, usually after a few hours of use and results in a surface which is unsuitable in the imparting of good optical qualities to the manufactured articles. When this occurs, the mold surface must be cleaned and repolished. Eventually, the combined abrasive effects which result through the use of the mold and those abrasive effects which result through polishing of the mold ultimately cause unacceptable tolerances and the mold must then be discarded, or rebuilt. The frequent repolishing that is required results in considerable machine down time and labor costs which significantly contribute to the overall cost of the glass molding operation.

It can be seen that the overall cost of providing acceptable mold elements is extremely high, even though cost considerations have played a major role in the development of the art. These considerations have particularly led away from the use of pure nickel and electroplated nickel, particularly in heavy thicknesses, to form mold elements.

SUMMARY OF THE INVENTION

It is a principal objective of the present invention to significantly reduce the overall cost of an optical quality glass manufacturing operation and, more particularly, to do so while maintaining high mold element performance and the ability to manufacture high quality objects. A more specific objective of the present invention is to provide a more economical process of making glass mold elements and especially one which is useful in the reconditioning of worn mold elements to their original form.

The accomplishment of these objectives is partially embodied in the provision for a process by which undersized molds are built up with substantial thickness of material, this allowing worn molds to be stripped and repeatedly reconditioned. These objectives are further achieved in part by a manner of utilizing thick layers of electroplated nickel, in spite of the known difficulties and expense involved in doing so, in order to realize certain advantages which allow for substantial reduction in the overall cost and superior performance over the present state of the prior art.

The present invention is further predicated in part upon the discovery that a mold made in accordance with the present invention requires less frequent polishing, is otherwise longer lasting, and performs better than presently used elements of the prior art in addition to lending itself to easy and inexpensive reconditioning. In addition, it has been found that the mold of the present invention requires less frequent polishing through increased oxidation and chemical resistance of the surface. Furthermore, the overall glass manufacturing operation performed in accordance with the present invention yields cost savings which are of surprising and unexpected magnitude. It is expected that, with the present invention, pro rata mold cost per glass article made will be reduced to from five to fifteen percent of the prior art costs. Addtional savings through decreased machine down time and increased productivity are also expected.

According to the present invention, a mold element is initially formed undersize, and then its surface is built up with a layer of electroplated nickel until the mold element is oversize by a thickness which is sufficient for machining and polishing down to the required ultimate shape. After the mold has been used and has worn to the point of unsuitability for further use, the present invention provides for the stripping or undercutting of the surface and the building up of the surface again with a layer of electroplated nickel in a thickness which is sufficient to replace the material removed through wear and stripping and provide additional material so that the mold can be re-machined to the original ultimate shape. By this process, the molds are reusable almost indefinitely.

It has been found that forming mold elements in this manner accomplishes the objectives of the invention and provides a mold which is superior to the prior art molds by a surprising and unexpected degree. Furthermore, the cost of the molds used in a glass making operation is drastically reduced in spite of the fact that the electroplating of nickel to the thicknesses proposed is a tedious and time consuming process and requires specially shaped electrodes. What has been found is that a worn mold, heretofore virtually worthless and unusable, can be reconditioned almost indefinitely for about one-fifth to one-fourth the cost of a replacement mold and in about one-fourth to one-third the time required to form a mold element from stock material. Furthermore, it has been found that mold elements made according to the process of this invention resist oxidation and have far better release properties than do molds presently used. The molds of the present invention last from four to five times as long between required polishings and have an overall life which is from four to five times that of presently available molds of the prior art. This, coupled with the fact that the molds can be reconditioned, results in an overall process wherein the cost of the forming elements is reduced to from five to fifteen percent of previous cost, and provides greater productivity through decreased machine down time.

The problems encountered in applying heavy electroplated nickel layers have been in providing a thick layer which will adhere to the core, and in the prevention of cracking of the heavy plated layer. These problems are believed to be due primarily to internal stresses which are set up in the plated layer as a result of particular plating processes. When thick layers are electrically deposited, these stresses, when present, result in forces which cause a warping of the layer to the extent that the bond between the layer and core is broken, resulting in a parting of the layer from the core. Sometimes these stresses cause a cracking of the layer and in some cases even the core. While it is possible to relieve these stresses by heat treating, for example, it has been found that to do so results in a surface which does not have the finish and release properties of the present invention. It is belived that this is due to the formation in the layer of microscopic cracks as the stresses are so relieved.

To avoid these problems, in accordance with one aspect of the present invention, it is proposed that the plating be performed with a process which results in an essentially "stress-free" deposit of nickel. The term stress-free is, however, difficult to quantitatively define, and the actual stresses within a deposited layer are difficult to measure. However, it is generally within the skill of those in the electroplating art to select certain processes which result in lower stresses than others, when all of the teachings contained within the present application are considered, and particularly the specific examples set forth herein.

The nickel electroplating processes which have presented the greatest problems in this line have been found to be those which result in plated layers of essentially columnar crystalline structure such as many conventional "hard-nickel" plating processes. Those which are found to be more suitable for purposes of the present invention are those which result in a generally lamilar crystalline structure. Of the processes which result in this lamilar structure, conventional sulfamate nickel processes have been found very good in providing the advantages of the present invention, and accordingly processes of this type are preferred and are set forth in detail below. It is further contemplated that other such processes can also be selected by those skilled in the electroplating art when given the teachings of the present application.

Certain of the advantages of the present invention in the glass making art are believed to be due in part to the fact that molds covered with a nickel surface electroplated from a sulfamate nickel bath, particularly to the exceptionally great thicknesses which the present invention provides, will oxidize at a slower rate than prior art optical glass manufacturing molds and therefore require less polishing and, furthermore, result in increased overall life of the mold between reconditioning operations which is three to four times that of prior art molds. This is believed to be true even though these molds possess a softer surface than has heretofore been thought desirable for optical glass manufacturing operations. A further advantage of the present invention results from the fact that this softer electroplated nickel surface of substantial thickness can be readily machined and polished, and readily removed and replaced with subsequent electroplating, to recondition the mold to its original new condition at approximately one-third the cost than has been required for rebuilding and replacing molds of the prior art.

The present invention specifically provides a general method of fabricating, using and maintaining the apparatus used in the manufacture of optical quality glass articles from molten glass by initially fabricating the forming elements by initially shaping a hard metallic heat conductive core of base metal such as cast iron to a dimension of for example from 0.010 to 0.050 inches undersized and then building up these surfaces with nickel electroplated from a sulfamate nickel bath to a thickness of for example from 0.060 to 0.100 inches so that the surface from 0.010 to 0.090 inches oversized and then machining and polishing the surface to the ultimate shape to expose the essentially pure nickel plate to the molten glass. The mold elements will include this base metal having a strippable layer of polished nickel electroplated onto the base in a thickness preferably ranging from between approximately 0.010 to 0.020 inches up to an approximate thickness of between 0.040 to 0.075 inches.

The elements so made are used until the surface has either oxidized or chemically reacted to the point at which acceptable articles can no longer be manufactured by them. At this point, the surfaces are repolished and then the molds are reused until they again must be repolished. The using and polishing steps continue until the mold has been deformed, partially due to the removal of material during repolishing and partially due to abrasion through use, resulting in dimensions which are beyond acceptable tolerances. When this has occurred, the mold elements are reconditioned to their original form by the process of stripping usually only the nickel plating from the surfaces and then re-electroplating them again in a sulfamate nickel bath to restore the thickness of the coating to the approximate thickness previously set forth and then followed by a repolishing of the replated surface down to the precise desired tolerance and finish.

The strippability feature has not been employed in molds of this type. Generally, however, hard chromium mold surfaces for use in molding objects other than glass have been provided with thin strippable wear resistant surfaces of electroplated chromium, as for example as disclosed in Welcome U.S. Pat. No. 2,349,920. Such a strippability feature is not known to have been incorporated into the optical glass manufacturing art in the manner proposed and accordingly none of the advantages of the present invention has been realized by any such attempts.

The utility of the present invention is most significant in the manufacture of optical quality glass, and particularly in the manufacture of large articles such as television picture tubes. It is to be appreciated, however, that it may yield advantages in the manufacture of other types of glass articles or smaller glass articles.

These and other objectives and advantages of the present invention will be more readily apparent from the following detailed description of the drawings, illustrating mold elements made according to principles of the present invention and for use in the methods of the present invention.

DESCRIPTION OF THE DRAWINGS

Referring to FIG. 1, a pair of mold elements 11 and 12 are illustrated which form the mold elements used in the manufacture of screens for television picture tubes. The upper element 11 or plunger element reciprocates downwardly into the lower element 12 or mold element to compress a hot gob 13 of molten glass to its ultimate shape. This shape is defined by the spacing between the outer and inner surfaces 15 and 16 of the elements 11 and 12, respectively, when the plunger 11 is in its lowest position. The lowest position of the plunger 11 is illustrated by the phantom line 15'. As the plunger surface 15 approaches the mold surface 16, the gob of molten glass 13 is squeezed between the two surfaces until the entire surface of the mold 12 is covered with the glass. The molten glass 13 must flow along the respective surfaces and be forced upwardly around the corner bends 17 of the mold elements until it is extruded from the edges of the elements 18.

Figure 1:
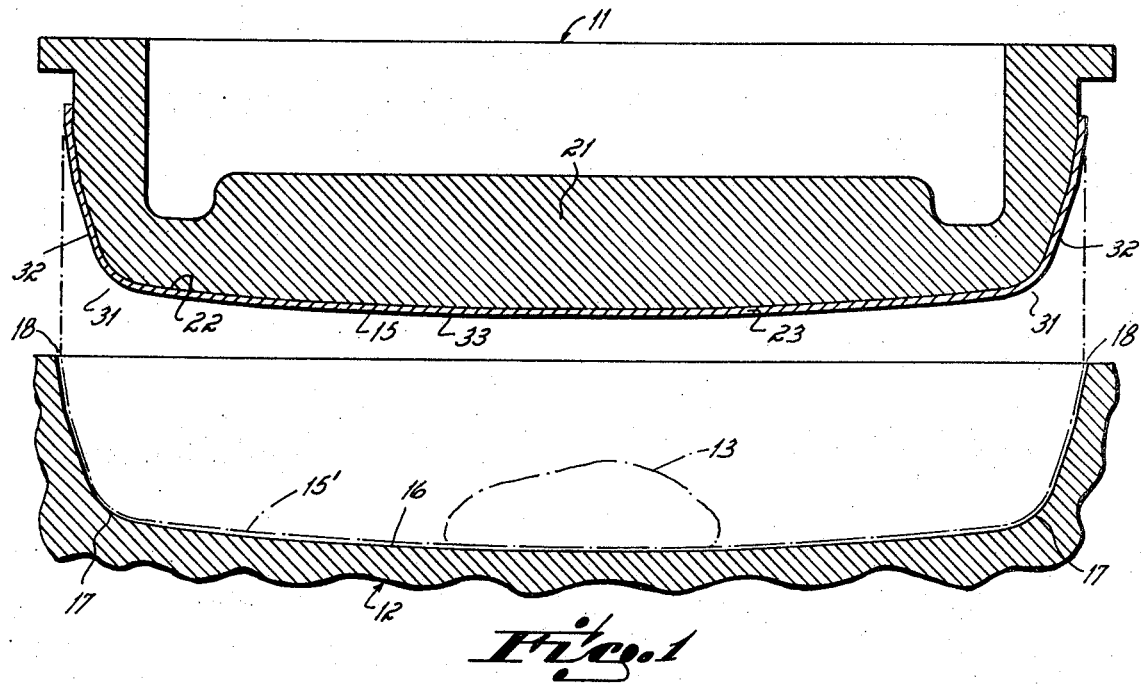
FIG. 1 is a generally exaggerated diagrammatic cross-sectional view illustrating a pair of forming elements for use in the manufacturing of television picture tube screens with the plunger element of the pair plated in accordance with the teachings of the present invention.

This construction of each of the elements 11 and 12 may be accomplished in the same manner as will be described below with reference to the plunger element 11. First, a basic core 21 is cast from a hard metal such as cast iron, nickel alloys such as Monel and Duro nickel, 410 stainless steel, etc. This metal should also possess good thermal conducting properties, maintain its strength and metallurgical properties at least up to 2000°F, and be readily electroplatable with nickel. This core 21, after casting, is then machined at its lower surface 22 to approximate conformity with the ultimate desired shape that the plunger 11 is to attain. This shape will be undersized by approximately 0.010 to 0.050 inches, and preferably by about 0.020 to 0.030 inches from the ultimate desired shape.

The machining of the core 21 down to this size can be done by several standard methods. One preferred method is to cut the sides back on a numerically controlled vertical milling machine and to cut back the plunger face on a lathe which sweeps a cutting tool across the face until the approximate desired contour is attained. When this has been done, the entire forming surface is brought to within a few thousandths of an inch of the desired shape on an electric discharge machine which utilizes a shaped electrode, usually of carbon, to slowly burn the surface to this shape.

The shaped surface is preferably hand finished with a number 400 grit stone to about a 10 to 30 rms finish. In the finishing process, all marks and irregularities must be removed and all corners must be rounded to as long a radius as can be tolerated, as for example one-fourth inch. Any irregularities in the surface will cause concentrations in the plating current which will deposit excess nickel at the high points. This will worsen as the plating process progresses, causing peaks and possibly bridging which will leave bubbles or voids in the plate which must be avoided if a suitable plating of the required thickness is to be deposited.

When the surface has been properly prepared as set forth above, the mold element 11 is electroplated by a nickel plating process. Chemical techniques for nickel plating are well known in the electroplating art. These are set forth in publications such as *Metal Finishing Guidebook*, 1971 edition, published by and available from Metals and Plastics Publications, Inc., 99 Kinderkamack Road, Westwood, New Jersey 07675. These methods are used in this invention, however, to apply a substantially thicker coating of nickel than is commonly applied. It is desirable to use a process which will apply a substantially stress-free deposit of nickel and particularly one which results in a lamilar crystalline structure. The importance of "low-stress" or "stress-free" deposits is discussed in the Metal Finishing Guidebook, generally through the nickel plating section, pages 312–335, particularly on pages 335, 328, 330, 324 and 343–344. A suitable process is the sulfamate nickel process set forth on pages 328–300 of the Metal Finishing Guidebook. With coatings of the required thickness, it will be appreciated by those skilled in the electroplating art that extreme care must be exercised.

As an example of the suitable plating technique, the following illustration is given. The surfaces are first thoroughly cleaned in an alkaline cleaning solution and then, without being allowed to dry, are thoroughly rinsed in water. It is preferred that, for all solutions and rinses, de-ionized water be used. Next, with the surface kept wet, it is transferred to an acid etch tank. For 420 stainless steel core, an etch solution of 25 percent by weight of sulfuric acid is acceptable. A reverse current of 250 amps per square foot is applied at six volts between the element and carbon cathodes while the element is agitated by reciprocating along about an eight-inch path at about one-third cycle per second. Following this, the element is transferred while still wet to a water rinse to thoroughly remove the acid. Following this, with the surface still wet, the mold element is placed in a plating solution. Specially contoured nickel anodes are maintained in a position spaced from the mold surface by about two inches and both the mold and anode are continuously agitated in the bath by reciprocation along a pah of approximately eight inches at about one-half cycle per second for several days while 20 amps per square foot of current is applied at about three volts, the rate of deposition being about one mil per hour. One composition of the bath which has been found suitable is a standard sulfamate nickel bath having a nickel sulfamate concentration of 40 ounces per gallon and a boric acid concentration of roughly four ounces per gallon. The bath temperature is normally maintained at about 130°F with the solution pH maintained at approximately 4.0. The surface tension of the solution is maintained at about 30 dynes per cm.

The present invention is not directed to the electroplating art, and, accordingly, those skilled in that art will appreciate that variations in the process can be made. For example, considerable differences in the etching steps may be employed with different base metals. But careful surface preparation prior to plating results in improved results.

When the plating 23 has been deposited it will have built up the outer surface by an amount which is at least about 0.010 inches and which preferably is approximately 0.060 to 0.100 inches. As the undercut surface may be typically non-uniform, being undersize by for example 0.010 to 0.040 inches at different points, the plated surface will range from about 0.010 to 0.090 inches oversize, typically about 0.030 to 0.040 inches average. When this thickness has been deposited to this dimension, the outer surface 15 is cut back by the oversize dimension according to the process similar to that used in forming the original core. That is, an N/C vertical milling machine and lathe cut the surface to near the desired dimension, and an electric discharge machine brings it to within the order of a few thousandths of an inch, as for example 0.003 inches, of the ultimate shape. Then the surface is polished to a high gloss finish exposing the plated material 23. Conventional polishing techniques are suitable for that purpose.

This surface, it has been found, oxidizes more slowly than the present state of the art molds, has far better release properties, is far longer lasting, and can easily be stripped and replaced when necessary.

The mold elements as prepared in this form are used until the surfaces 15 and 16 have oxidized or chemically reacted with the molten glass to the degree that they have become dull and generally covered with a thin film or deposit. This surface imparts adverse properties to the manufactured articles and, when in this condition, must be cleaned and repolished.

Figure 2:
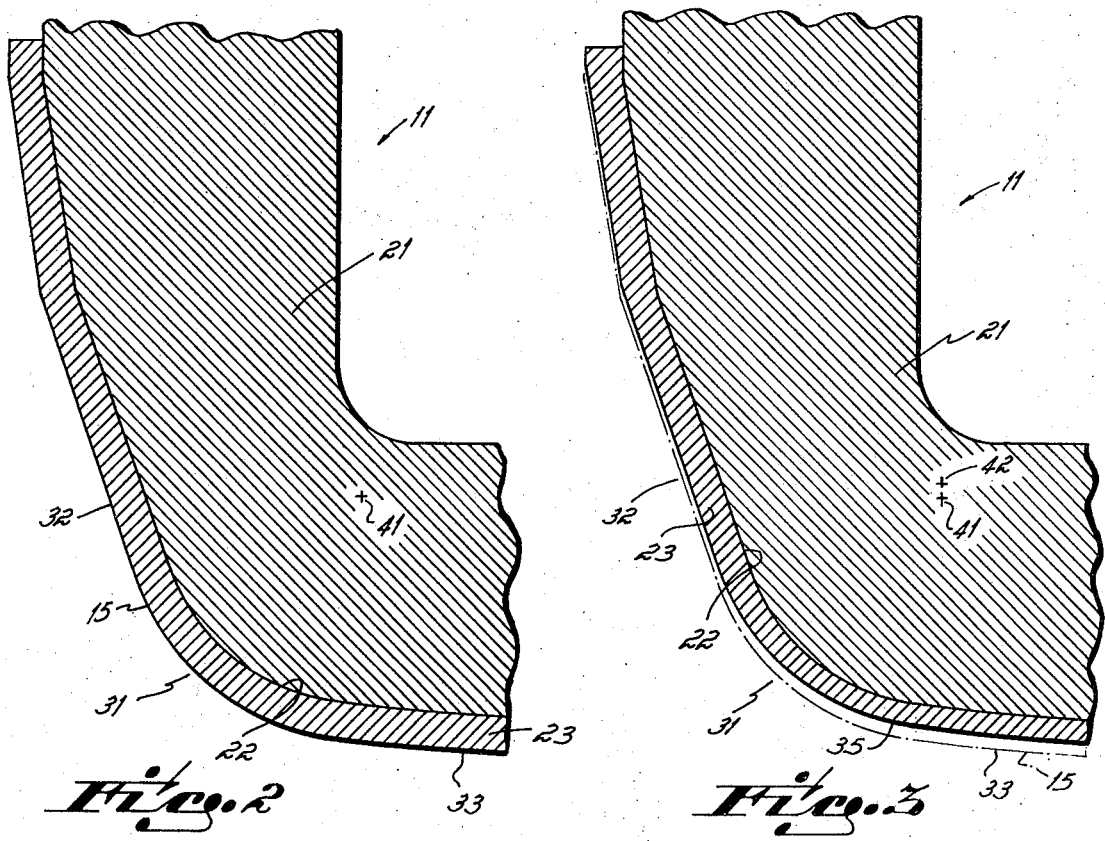
FIG. 2 is a section view of a portion of the plunger element of FIG. 1 after initial fabrication or reconditioning.
Figure 3:
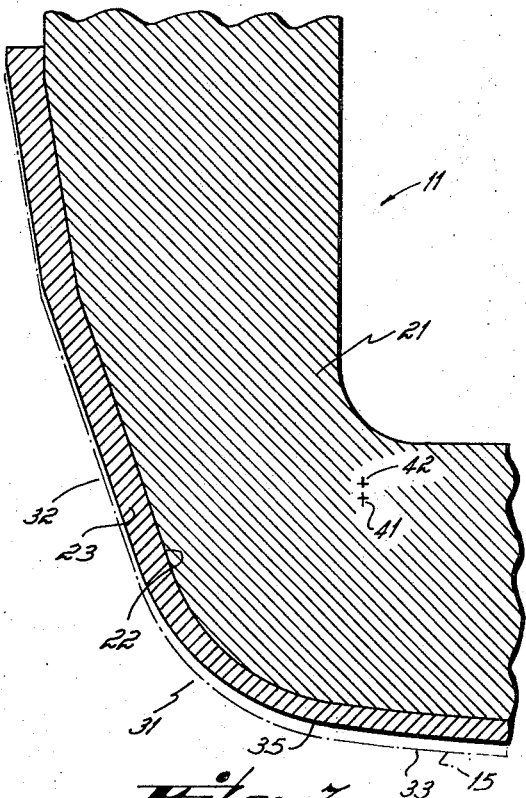
FIG. 3 is a view similar to FIG. 2 but showing the plunger in cross section after one or more of the repolishing operations have been performed.

Referring to FIG. 2, the core 21 of the plunger element 11 is shown in the form immediately after the initial fabrication. The outer surface 22 of the core 21 has deposited thereupon the electroplated nickel coating 23. The outer surface 15 of the coating 23 is the outer surface of the plunger element 11. After repeated use of ten or 12 hours, the surface 15 will exhibit some wear, particularly noticeable in the vicinity of the bend 31. The surface 15 will also exhibit considerable film or oxidation scale in the flatter regions 32 and 33 as will be generally present throughout the surface. Repolishing of the mold will change the overall shape of the mold slightly but the outer surface must still bear the same precise contour as the original surface. This is illustrated more clearly in FIG. 3, which shows in phantom lines the origin surface of the mold 15 and the new repolished surface 35. The vertical distances between all corresponding points on the two surfaces will be precisely the same. This will result in the removal of more material from the region 33 than from the regions 32. The remachining or polishing operation results in a vertical displacement of the center of the curved region 31 from point 41 which is the center of the surface 15 to point 42 which is the center of the surface 35 in the region 31. The machining operation or repolishing operation is carried out by lightly buffing the surface, removing up to two to three thousandths of an inch, just enough to remove the scale and to eliminate any small scratches or nicks which may have resulted during use.

After repeated use and repolishing, it will be seen that the coating will have substantially depleted to the point where it cannot be maintained to proper tolerances without exposing the core material 21, or without forming a materially undersized mold element. When this occurs, it is necessary to recondition the mold by stripping the plating 23 and replacing it with a new layer to restore it to that form shown in FIG. 2.

The stripping operation may proceed in the same manner as the preparation of the core. It is presently believed that this method will be the best but chemical stripping and stripping by electric discharge are also possible and may be very suitable for this step. The depth of the stripping process is preferably the depth of the remaining plate only. When the stripping is completed, the surface is prepared for electroplating as it was previously in the original plating operation.

At this stage, the surface is replated in the same manner that the original plating was put onto the surface as set forth above. This plating restores the surface and builds up the mold to beyond its ultimate dimension.

It is expected that the recondition of the molds can be carried out almost indefinitely by repeated reconditioning steps according to the present invention, so long as other deterioration of the core, such as through hardening or some other structural factor, does not result.

We claim:

1. An improved method of fabricating, using and reconditioning apparatus for forming optical quality glass articles from molten glass, said apparatus including a mold having a glass forming element, said method comprising the steps of, in order:
   a. forming a metallic core from a hard heat conductive material which is suitable for electroplating with nickel; then
   b. shaping the surface of said core so that it is undersized with reference to a predetermined shape by at least about 0.010 inches less than said shape; then
   c. electroplating a layer of nickel onto said surface to build up said surface so that it is oversized with reference to said predetermined shape; then
   d. removing nickel from said surface until said surface approximately conforms to said predetermined shape; then
   e. polishing said nickel layer to a given finish and to within given tolerances of said predetermined shape; then
   f. utilizing said fabricated glass forming element to manufacture optical quality glass articles from molten glass until said glass contacting surface of said element no longer has a suitable finish for further manufacture of glass articles of optical quality; then
   g. repolishing said surface to restore said surface to said suitable finish; then
   h. reusing said repolished glass forming element until said glass contacting surface again no longer has a suitable finish for further manufacture of optical quality glass; then
   i. returning to step (g) if said surface is capable of being repolished to within said given tolerances of said predetermined shape and capable of further use thereafter; then
   j. stripping said surface of said mold so that it is undersized with reference to said predetermined shape by at least about 0.010 inches less than said shape; then k. electroplating a layer of nickel onto said surface to build up said surface so that it is oversized with reference to said predetermined shape to replace material removed through stripping and wear; then l. removing nickel from said surface until said surface approximately conforms to said predetermined shape; then m. polishing said nickel layer to a given finish and to within given tolerances of said predetermined shape; then n. repeating at least once steps (f) through at least step (h).

2. An improved method of using and reconditioning apparatus for forming optical quality glass articles from molten glass, said apparatus including a mold having a glass forming element having a predetermined shape, said method comprising the steps of, in order:

a. utilizing said glass forming element to manufacture optical quality glass articles from molten glass until the glass contacting surface of said element no longer has a suitable finish for further manufacture of glass articles of optical quality;

b. then repolishing said surface to restore said surface to a suitable finish;

c. reusing said repolished glass forming element until said glass contacting surface again no longer has a suitable finish for further manufacture of optical quality glass;

d. returning to step (b) if said surface is capable of being repolished to within said given tolerances of said predetermined shape and capable of further use thereafter;

e. stripping said surface of said mold so that it is undersized with reference to said predetermined shape by at least about 0.010 inches less than said shape; then f. electroplating a layer of nickel onto said surface to build up said surface so that it is oversized with reference to said predetermined shape to replace material removed through stripping and wear; then g. removing nickel from said surface until said surface approximately conforms to said predetermined shape; then h. polishing said nickel layer to a given finish and to within given tolerances of said predetermined shape; then i. repeating at least once steps (a) through at least step (c).

3. An improved method of using and reconditioning apparatus for forming optical quality glass articles from molten glass, said apparatus including a mold having a glass forming element having a predetermined shape, said method comprising the steps of, in order:

a. utilizing said glass forming element to manufacture optical quality glass articles from molten glass until the glass contacting surface of said element has worn to beyond given tolerances from said predetermined shape; then b. stripping said surface of said mold so that it is undersized with reference to said predetermined shape by at least about 0.010 inches less than said shape; then c. electroplating a layer of nickel onto said surface to build up said surface so that it is oversized with reference to said predetermined shape to replace material removed through stripping and wear; then d. removing nickel from said surface until said surface approximately conforms to said predetermined shape; then e. polishing said nickel layer to a given finish and to within given tolerances of said predetermined shape; then f. repeating step (a).

4. A method of fabricating and reconditioning a mold element for use in the manufacture of optical quality glass articles from molten glass, said method comprising the steps of:

forming a metallic core from a hard heat conductive material which is suitable for electroplating with nickel; then shaping the surface of said core so that it is undersized with reference to a predetermined shape by at least about 0.010 inches less than said shape; then electroplating a layer of nickel onto said surface to build up said surface so that it is oversized with reference to said predetermined shape; then removing nickel from said surface until said surface approximately conforms to said predetermined shape; then polishing said nickel layer to a given finish and to within given tolerances of said predetermined shape, then using the element for molding optical quality glass articles until mold reconditioning is needed, reconditioning the mold by the said shaping, electroplating, removing and polishing steps set forth above, and again using the mold element for molding optical quality glass articles.

5. A method of making and reconditioning a mold element for use in the manufacture of optical quality glass articles from molten glass, said method comprising the steps of:

preparing the surface of a hard heat conductive metallic core for electroplating including shaping the surface of said core so that it is undersized with reference to a predetermined shape by at least about 0.010 inches less than said shape; then electroplating a layer of nickel onto said surface to build up said surface so that it is oversized with reference to said predetermined shape; then removing nickel from said surface until said surface approximately conforms to said predetermined shape; then polishing said nickel layer to a clean optical quality finish and to within given tolerances of said predetermined shape, using said element for molding optical quality glass articles until reconditioning is needed, then stripping the nickel from said surface and repeating the electroplating, removing and polishing steps, and reusing the mold so reconditioned.

6. A method according to claim 5 wherein:
said electroplating step is performed by a process which results in an essentially stress-free deposit of nickel onto said core.

7. A method according to claim 5 wherein:
said electroplating step is performed by a process which results in a nickel deposit which has a lamilar crystalline structure.

8. A method according to claim 5 wherein:

said electroplating step is performed by a sulfamate nickel plating process.

9. A method according to claim 4 wherein:

the electroplating is performed by a process which results in an essentially stress-free deposit of nickel onto said core.

10. A method according to claim 4 wherein:

the electroplating is performed by a process which results in a nickel deposit which has a lamilar crystalline structure.

11. A method according to claim 4 wherein:

the electroplated nickel layer is plated to a thickness of at least 0.050 inches.

12. A method according to claim 4 wherein:

the electroplated nickel layer is plated to a thickness which builds up said surface to at least 0.010 inches beyond said predetermined shape.

13. A method according to claim 4 wherein:

the undersized dimension is at least 0.020 inches less than said predetermined shape and not more than approximately 0.050 inches less than said predetermined shape.

14. A method according to claim 4 wherein the forming step includes the substeps of:

cutting said core to a shape which is within about .003 inches of a surface which is parallel to said predetermined shape;

reducing said core by an electric discharge process to within 0.003 inches of the undersized dimension; and finishing said surface by approximately a 400 grit grinding to approximately a 20 rms finish.

15. A method according to claim 4 wherein the nickel removing step includes the substeps of:

cutting said core to within about 0.003 inches of a surface which is parallel to that of said predetermined shape;

reducing said core by an electric discharge process to within about 0.003 inches of the undersized dimension; and finishing said surface by approximately a 400 grit grinding to approximately a 20 rms finish.

16. A method according to claim 4 wherein:

the shaped undersized dimension is not less than 0.010 inches at any point on said surface.

* * * * *